(12) United States Patent
Igata et al.

(10) Patent No.: US 7,630,979 B2
(45) Date of Patent: Dec. 8, 2009

(54) INFORMATION RETRIEVAL TERMINAL

(75) Inventors: Nobuyuki Igata, Yokohama (JP); Hiroshi Tsuda, Fujisawa (JP)

(73) Assignee: Fujitsu Limited, Kawasaki (JP)

( * ) Notice: Subject to any disclaimer, the term of this patent is extended or adjusted under 35 U.S.C. 154(b) by 288 days.

(21) Appl. No.: 11/025,470

(22) Filed: Dec. 28, 2004

(65) Prior Publication Data
US 2006/0005123 A1    Jan. 5, 2006

Related U.S. Application Data

(63) Continuation of application No. PCT/JP2004/009164, filed on Jun. 30, 2004.

(51) Int. Cl.
G06F 7/00    (2006.01)
(52) U.S. Cl. .......................................... 707/6
(58) Field of Classification Search ................ 707/1–6, 707/104; 715/500.1, 797
See application file for complete search history.

(56) References Cited

U.S. PATENT DOCUMENTS

| | | | |
|---|---|---|---|
| 5,819,261 A * | 10/1998 | Takahashi et al. | 707/3 |
| 6,397,213 B1 * | 5/2002 | Cullen et al. | 707/5 |
| 6,789,228 B1 * | 9/2004 | Merril et al. | 715/500.1 |
| 7,289,982 B2 * | 10/2007 | Saito et al. | 707/3 |

FOREIGN PATENT DOCUMENTS

| | | |
|---|---|---|
| JP | 5-028199 | 2/1993 |
| JP | 6-309362 | 11/1994 |
| JP | 6-314296 | 11/1994 |
| JP | A 8-297680 | 11/1996 |
| JP | A 9-153054 | 6/1997 |
| JP | 10-232870 | 9/1998 |
| JP | 11-177899 | 7/1999 |
| JP | A 2000-78530 | 3/2000 |
| JP | 2001-075981 | 3/2001 |
| JP | A 2001-236361 | 8/2001 |
| JP | A 2002-297645 | 10/2002 |
| JP | A 2002-351893 | 12/2002 |
| JP | A 2004-30465 | 1/2004 |
| JP | A 2004-145586 | 5/2004 |
| JP | A 2004-199395 | 7/2004 |

* cited by examiner

Primary Examiner—Cheyne D Ly
(74) Attorney, Agent, or Firm—Greer, Burns & Crain, Ltd.

(57) ABSTRACT

An information retrieval terminal provides keywords to an information retrieval device and instructs it to retrieve by using such keywords. The information retrieval terminal includes an information collector for collecting screen information, image information, and voice information around the information retrieval terminal and for obtaining text information from the collected information. A keyword-candidate extracting unit extracts a word related to a retrieval word input by a retriever from the text information obtained by the information collector, and sets the extracted word to be a keyword candidate. A retrieval instructing unit gives an instruction to retrieve by using the retrieval word and the keyword candidate set by the keyword-candidate extracting unit as keywords.

7 Claims, 12 Drawing Sheets

Bigfoot(2), snowy mountain(2), legend(2), America(1), Swizerland(1)......

FIG. 4B

| FILE NO. | ATTRIBUTE INFORMATION | | | TEXT INFORMATION |
| --- | --- | --- | --- | --- |
| | FILE TYPE | WINDOW ORDER | DISPLAY RANGE | |
| FILE 1 | Tex | 2 | Lines34~59 | What would you imagine from the word "Nasca"? How about "Kiska" or "Asca"? ... |
| FILE 2 | Power Point | 3 | P3 | Parietal lobe, Movement, Cerebration, Central sulcus, Perceptibility, Comprehension, Recognition, Vision, Articulation, Interpretation, Memorization ...... |
| FILE 3 | Mail | 1 | Title Body 2lines | Welcom to Mystery Tour ! In YY village in XX prefecture in a heavy snowfall area, ...... |

FIG. 8

INFORMATION RETRIEVAL TERMINAL

This is a continuation of International PCT Application No. PCT/JP2004/009164 filed Jun. 30, 2004.

BACKGROUND OF THE INVENTION

1. Field of the Invention

The present invention relates to an information retrieval terminal for use with an information retrieval device for retrieving information, such as text information, by using keywords. More particularly, the invention relates to an information retrieval terminal for extracting keywords from information in surrounding of the information retrieval terminal and for instructing an information retrieval device to retrieve by using the extracted keywords.

2. Description of the Related Art

In today's information society, the importance of information is being reconsidered. Accordingly, techniques for retrieving desired information from a database storing a large amount of information are becoming more and more important. Hitherto, retrievers (searchers) experienced in special retrieval techniques have retrieved. Due to the widespread use of the Internet, however, it has become normal for general users to retrieve by using information retrieval devices. Generally, however, it is difficult for general users to specify suitable keywords and to find desired information. Accordingly, many known techniques for assisting users to specify keywords have been proposed. Such techniques are largely divided into the following three categories:

(1) using dictionaries of synonyms, thesauruses, and related terms (for example, see Japanese Unexamined Patent Application Publication No. 5-28199 (page 2, FIG. 1) and Japanese Unexamined Patent Application Publication No. 6-309362 (page 2, FIG. 1));

(2) using retrieval logs and user profiles (for example, see Japanese Unexamined Patent Application Publication No. 6-314296 (page 2, FIG. 1)); and (3) using previous retrieval results (for example, see Japanese Unexamined Patent Application Publication No. 10-232870 (page 1, FIG. 3)).

The above-described techniques are similar in that keywords not considered by the users are provided and used for keywords for retrieving information. However, resources for extracting keywords are different, and thus, advantages obtained by these techniques are also different.

Although it has become common for general users to retrieve information, it is often the case in which expected retrieval results cannot be obtained unless the specified keywords are suitable.

In the method using a dictionary of, for example, synonyms, since a systematized dictionary is used as a resource, keywords can be always provided stably. However, since such a dictionary is fixed, the same keywords may be presented to a user who may have another intention for retrieval.

In the method using a retrieval log, since behavior patterns based on individual users are managed, different keywords can be presented to different users. However, even when a user wishes to retrieve with a behavior pattern different from the usual pattern, keywords similar to those based on the usual pattern are presented to the user.

In the method using a user profile, keywords matching the user profile can be presented. However, if the user has a retrieving intention different from attribute information registered in the profile, the profile must be updated, which needs a high cost to maintenance.

In the method using previous retrieval results, different keywords depending on documents obtained by the previous retrieval results can be presented. However, the user has to read all of the results documents to check whether each document matches a desired document.

Accordingly, in view of the above-described problems, it is an object of the present invention to achieve the provision of keywords reflecting the intention of a user, i.e., a retriever, by using information around the user.

SUMMARY OF THE INVENTION

In order to achieve the above-described object, an information retrieval terminal of the present invention is configured as follows.

The principle of a first aspect of the present invention is described below with reference to FIG. 1. The information retrieval terminal in accordance with the first aspect of the present invention includes a information collector 1, a keyword-candidate extracting unit 2, and a retrieval instructing unit 3.

The information collector 1 collects information around the information retrieval terminal for supplying retrieval information to an information retrieval device and obtains text information from the collected information. The devices attached to the information retrieval terminal include a display, a microphone, and a charge-coupled device (CCD) camera, and information obtained from such devices includes screen information obtained from the display, and voice information and image information collected from the vicinity of the information retrieval terminal.

The keyword-candidate extracting unit 2 extracts a word related to a retrieval word input by a retriever from the text information obtained by the information collector 1, and sets the extracted word to be a keyword candidate.

The retrieval instructing unit 3 sets the word extracted by the keyword-candidate extracting unit 2 and the retrieval word input by the retriever to be keywords, and instructs the information retrieval device to retrieve by using the keywords.

According to the first aspect of the present invention, information around a retriever operating the information retrieval terminal is collected, and the retriever can choose desired words from the collected information. Accordingly, unlike a known method for determining keywords from a registered dictionary or profile, keywords are not fixed.

According to a second aspect of the present invention, the information collected by the text information collector 1 may be screen information, image information, and voice information, and text information is obtained from such information. The screen information is information obtained from the display screen of the information retrieval terminal, and if email received by the information retrieval terminal is displayed on the screen, text information is obtained from the email. The voice information is information obtained by collecting voice (for example, conversation between the retriever and his/her neighbor) around the information retrieval terminal by using a microphone. Text information is then obtained from the voice information by using a known voice analysis technique. The image information is information concerning images around the information retrieval terminal. If the retriever is reading a document, the image information may be obtained by capturing the image of the document with a CCD camera, and text information is obtained from this image information by using a text recognition technique.

The keyword-candidate extracting unit 2 and the retrieval instructing unit 3 are similar to those of the first aspect of the present invention.

According to the second aspect of the present invention, keyword candidate words can be extracted from a window screen, such as a web page or email, displayed on the information retrieval terminal, or the voice of a retriever talking with his/her neighbor about the web screen in front of the information retrieval terminal, or an image captured from a document, for example, a leaflet, which is being read by the retriever.

According to a third aspect of the present invention, the keyword-candidate extracting unit 2 may include an extraction-range setting unit for detecting the position of a word which matches the retrieval word input by the retriever from the text information collected by the text information collector 1 so as to set an extraction range, for example, several tens of words or several lines around the detected position of the word. The keyword-candidate extracting unit 2 also includes a word extracting unit for counting the number of occurrences of each word in the extraction range so as to extract words having a predetermined number of occurrences or more. That is, the word extracting unit determines the frequency of occurrences of the same word in the extraction range to determine words having a certain number of occurrences or more. Then, the retrieval instructing unit 3 instructs the information retrieval device to retrieve by using the words determined by the word extracting unit and the retrieval word input by the retriever as keywords.

According to the third aspect of the present invention, words that are highly related to a retrieval word input by a retriever can be obtained. That is, highly precise keywords can be used for retrieval.

According to the present invention, the provision of keywords reflecting a retriever's intention can be achieved by using dynamic resources, such as information around the retriever.

BRIEF DESCRIPTION OF THE DRAWINGS

FIG. 4B illustrates an example of the extraction of words in the first embodiment;

FIG. 8 illustrates an example of data stored in a text/attribute information storage unit.

DESCRIPTION OF THE PREFERRED EMBODIMENTS

The present invention is described in detail below with reference to the accompanying drawings through illustration of preferred embodiments.

First Embodiment

In a first embodiment of the present invention, as information around an information retrieval terminal, information concerning a screen, voice, and images is collected, and keyword candidates are extracted from the collected information.

Figure 1:
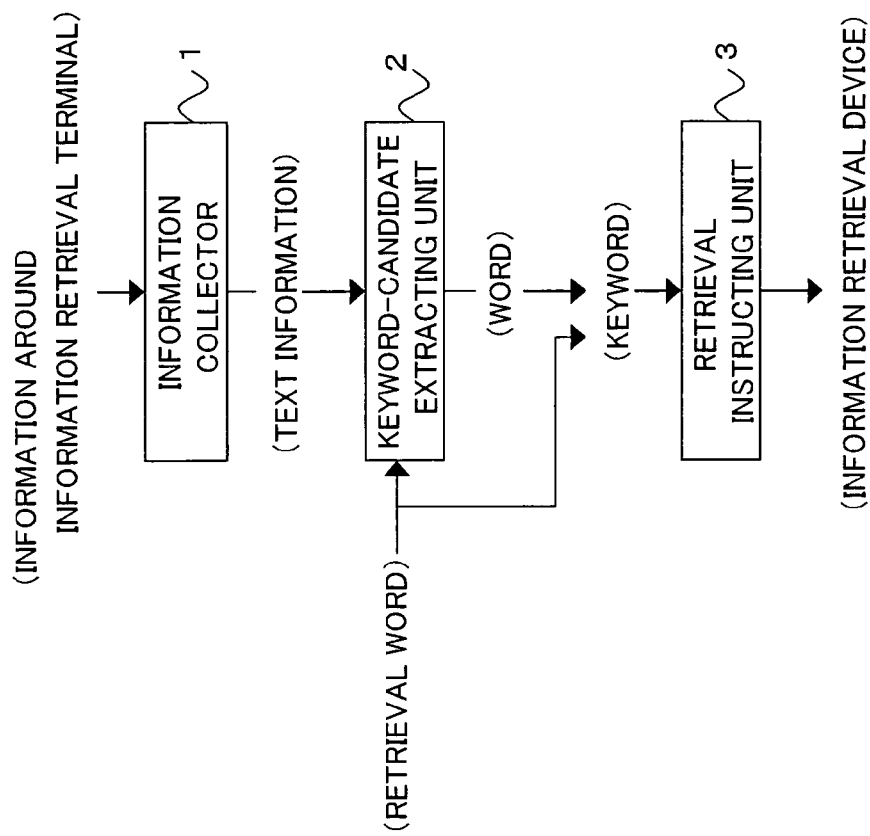
FIG. 1 illustrates the principle of the present invention.
Figure 2A:
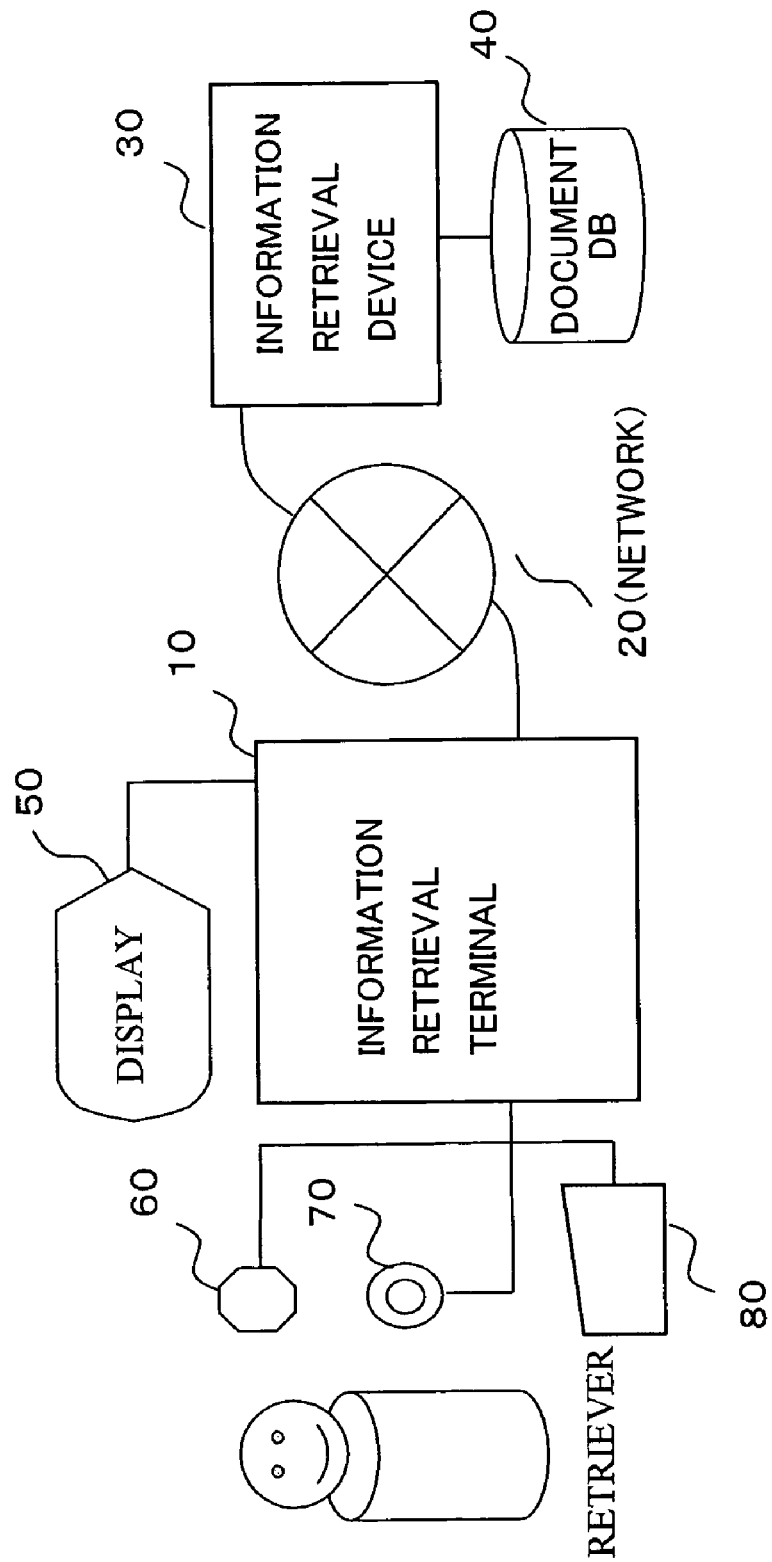
FIGS. 2A and 2B are block diagrams illustrating an information retrieval terminal according to a first embodiment of the present invention.

FIG. 2A illustrates the overall configuration of the first embodiment including an information retrieval terminal 10. The information retrieval terminal 10 is connected to an information retrieval device 30 via a network 20. The network 20 is connected to an email server and a web site (not shown).

The information retrieval terminal 10 is, for example, a personal computer, and is provided with a central processing unit (CPU), a memory, a hard disk, and various interfaces. A display 50, a camera 60, a microphone 70, and a keyboard 80 are connected to the information retrieval terminal 10. The display 50 displays data in accordance with the input from a retriever and the output of retrieval results, and email and web screens. The camera 60 captures images around the information retrieval terminal 10 with, for example, a CCD camera so as to collect image information. The microphone 70 collects voice around the information retrieval terminal 10 as voice information. The keyboard 80 allows the retriever to input retrieval words or to instruct the information retrieval device 30 to retrieve.

Figure 2B:
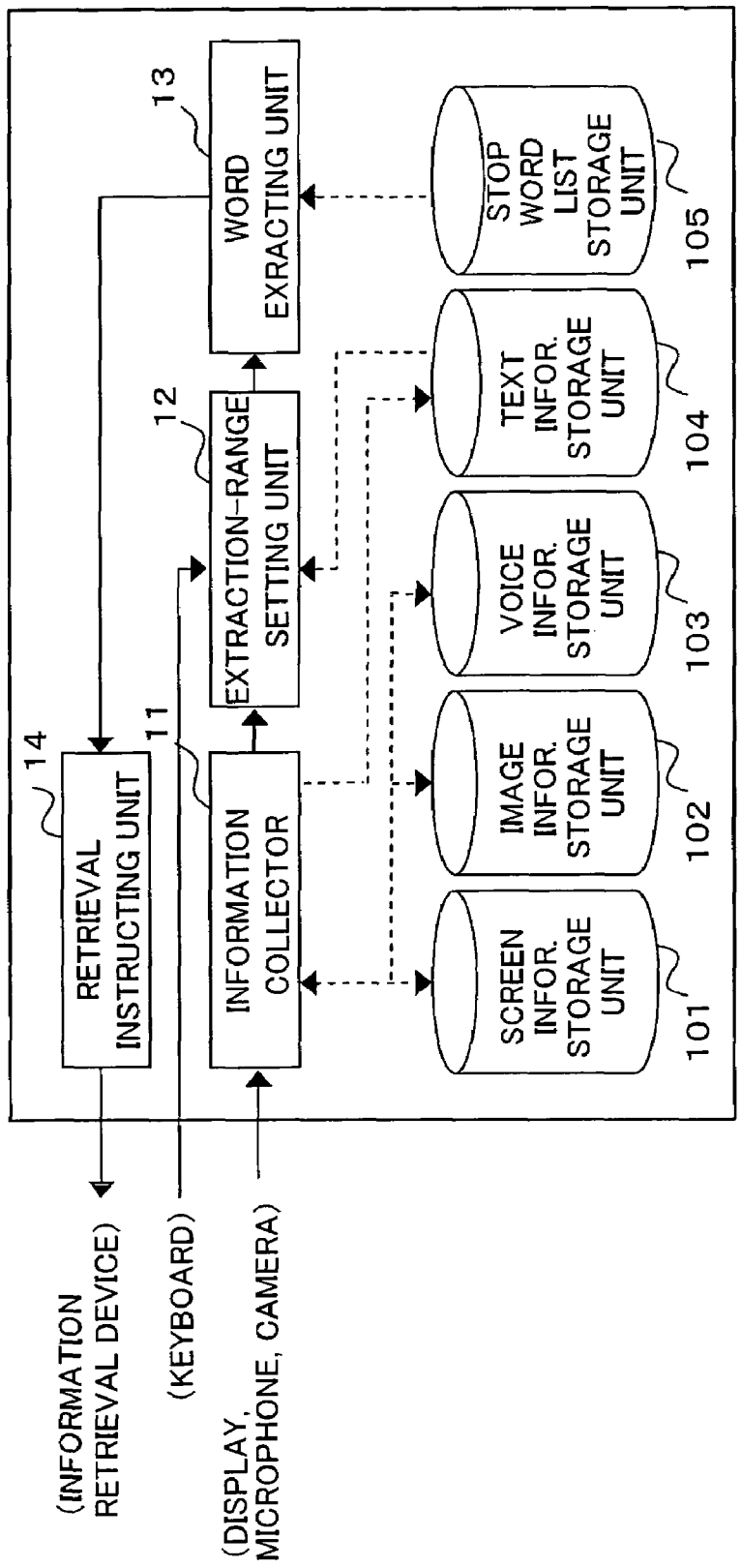

The internal configuration of the information retrieval terminal 10 is shown in FIG. 2B. The information retrieval terminal 10 includes processors, such as a text information collector 11, an extraction-range setting unit 12, a word extracting unit 13, and a retrieval instructing unit 14. These processors are programs and are executed in a memory under the control of the CPU. The information retrieval terminal 10 also includes storage units, such as a screen information storage unit 101, an image information storage unit 102, a voice information storage unit 103, a text information storage unit 104, and a stop word list storage unit 105. The screen information storage unit 101, the image information storage unit 102, and the voice information storage unit 103 store information obtained from the display 50, the camera 60, and the microphone 70, respectively, and such information is physically stored in a hard disk. The text information storage unit 104 stores text information obtained from the screen information, the image information, and the voice information. The stop word list storage unit 105 rejects common words, for example, "n", "the", "there", and etc., shown in the screen of FIG. 3, from keyword candidate words, and registers words to be rejected in advance.

The information retrieval terminal 10 also includes a voice recognition program for analyzing voice information to extract text information, a text recognition program for analyzing image information to extract text information, and a morphological analysis program for dividing text information into words according to classes (such programs are not shown). In FIG. 2B, a function of displaying retrieval results returned from the information retrieval device 30 is not shown.

Figure 3:
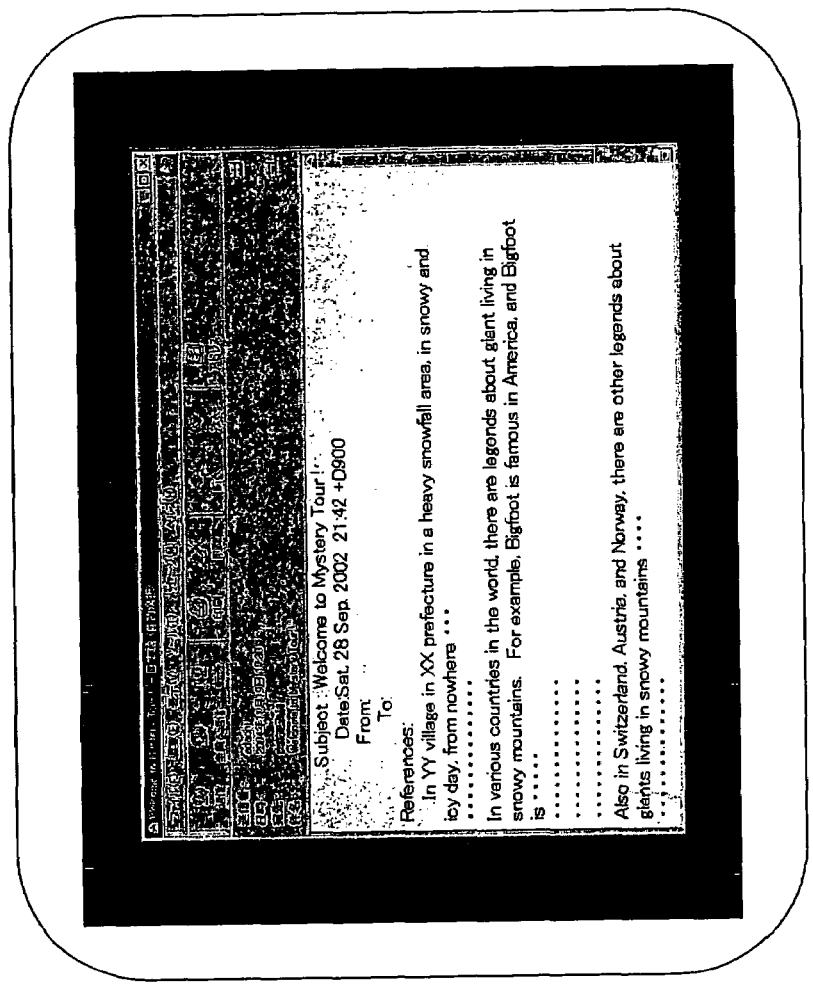
FIG. 3 illustrates an example of the screen in the first embodiment.

The processing performed by each of the text information collector 11, the extraction-range setting unit 12, the word extracting unit 13, and the retrieval instructing unit 14 is discussed below. The text information collector 11 collects screen information, image information, and voice information from the display 50, the camera 60, and the microphone 70, respectively, and stores the screen information, the image information, and the voice information in the screen information storage unit 101, the image information storage unit 102, and the voice information storage unit 103, respectively. To describe such information more specifically, the following situation is now considered. A retriever is talking with his/her neighbor in front of the information retrieval terminal 10 showing a web screen while reading a leaflet concerning the web screen. If the email window shown in FIG. 3 is displayed on the information retrieval terminal 10, information concerning this window is stored in the screen information storage unit 101. Image information captured by the camera 60 is obtained by capturing images, for example, for the last three minutes before retrieval is conducted. The image information includes, for example, an image of the leaflet which is being read by the retriever. As in the image information, voice information is also obtained by recording the voice, for example, for the last three minutes before retrieval is conducted. The image information and the voice information can be endlessly recorded within a predetermined set time. Then, text information is obtained from the screen information storage unit 101, the image information storage unit 102, and the voice information storage unit 103 by using the text recognition program and the voice recognition program, and is stored in the text information storage unit 104.

Figure 4A:
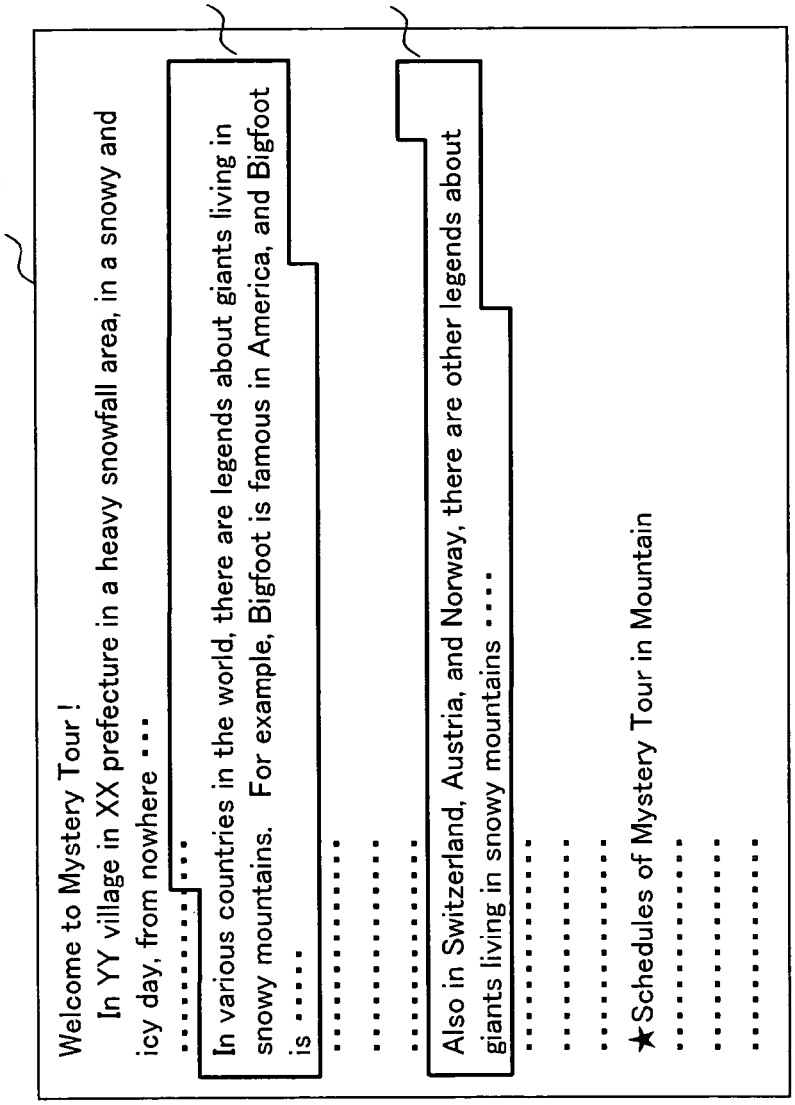
FIG. 4A illustrates an example of the setting of word extraction ranges in the first embodiment.

The extraction-range setting unit 12 receives a retrieval word input by the retriever by using the keyboard 80, and determines the position of a word which matches the received retrieval word from the text information stored in the text information storage unit 104. The extraction-range setting unit 12 then sets several tens of words around the determined position of the word to be a word extraction range. FIG. 4A illustrates the setting of word extraction ranges from the text information obtained from the window screen shown in FIG. 3. When the retriever inputs the word "giant" as the retrieval word, the positions of "giant" are found from the text information, as shown in FIG. 4A, and several tens of words around the word "giant" are set to be the word extracting ranges. In the example shown in FIG. 4A, the word "giant" is found in two portions of the text information obtained from the screen, and two word extraction ranges are set accordingly. Word extracting ranges can be similarly set from the text information stored in the text information storage unit 104 obtained from other screen information, image information, and voice information.

The word extracting unit 13 performs morphological analysis on the text information in each word extraction range so as to extract only nouns from the decomposed words. The frequency of occurrences is counted for each extracted word, and words satisfying a predetermined number of occurrences or more are set to be keyword candidates. FIG. 4B illustrates the number of occurrences in parentheses for each word (extracted nouns) obtained from the text information shown in FIG. 4A. Also for other screen information, image information, and voice information, the number of occurrences for the same word is counted, and is totaled. For example, if a predetermined number of occurrences is two, "Bigfoot", "snowy mountain", and "legend" satisfying the predetermined number or more are extracted as keyword candidate words in the example shown in FIG. 4B.

The retrieval instructing unit 14 instructs the information retrieval device 30 to retrieve by using, as keywords, the keyword candidate words obtained by the word extracting unit 13 and the retrieval word input by the retriever.

The first embodiment is described below with reference to the flowchart of FIG. 5. In step S1, a retrieval word is input by a retriever through the keyboard 80. Then, in step S2, screen information displayed on the display 50, image information obtained from the camera 60, and voice information obtained from the microphone 70 are collected, and are stored in the screen information storage unit 101, the image information storage unit 102, and the voice information storage unit 103, respectively. The image information and the voice information are information recorded for several minutes, for example, three minutes, before collecting the information. In step S3, text information is obtained from the information stored in the corresponding storage units by using the text recognition program and the voice recognition program, and is stored in the text information storage unit 104. Steps S1 through S3 are performed by the text information collector 11 shown in FIG. 2B.

In step S4, the position of a word that matches the retrieval word input by the retriever is found from the text information stored in the text information storage unit 104, and a predetermined number of words (for example, about 30 words) relative to the determined word are set to be a word extraction range. If there is more than one word matching the retrieval word, a plurality of word extraction ranges are set. Step S4 is performed by the extraction-range setting unit 12 shown in FIG. 2B.

Subsequently, in step S5, morphological analysis is conducted on the text information in the word extraction range, and in step S6, only nouns are extracted from the decomposed words. Normally, the extracted words form a word group consisting of a plurality of words including the same word. Then, in step S7, this word group is checked against the words registered in the stop word list storage unit 105, and the corresponding words are rejected from the word group since they are not suitable as keywords. In step S8, the number of the same word in the word group is counted, and the word is associated with the counted number. That is, in step S8, the words and the numbers of occurrences thereof in the word extraction range can be determined. The words having a predetermined number (for example, three) or more are set to be keyword candidates. Steps S5 through S8 are executed by the word extracting unit 13 shown in FIG. 2B.

In step S9, the information retrieval terminal 10 then instructs the information retrieval device 30 to retrieve by using, as keywords, the keyword candidate words determined in step S8 and the retrieval word input by the retriever. In step S10, in response to the instruction from the information retrieval terminal 10, the information retrieval device 30 retrieves a document database (DB) 40 and reports retrieval results to the information retrieval terminal 10. In step S11, the information retrieval terminal 10 displays the retrieval results on the display 50.

According to this embodiment, when the retrieval word input by the retriever is, for example, "giant", and when retrieval is conducted by using the word "giant" and keyword candidate words having two or more number of occurrences, it can be expected that information concerning "giants in snowy mountain" will be detected rather than "Giants", which is a professional baseball game team.

In this embodiment, the image information and the voice information for the last several minutes before retrieval is conducted is collected. However, such information may be presented to the retriever and the retriever may be instructed to choose desired items of information. Also, the keyword candidate words may be presented to the retriever and the retriever may be instructed to choose desired words.

In the setting of word extraction ranges, the number of lines or paragraphs may be used instead of the number of words. When obtaining text information from the voice information, keyword candidate words may be extracted based on the pitch of the voice. When extracting words from the text information, keyword candidate words which appear to be more important may be determined by using language information, for example, the modification structure, structural analysis, or topic recognition techniques.

Second Embodiment

In the first embodiment, text information is obtained from screen information, image information, and voice information collected around the information retrieval terminal 10, a word extraction range is set based on the position of a word in the text information which matches a retrieval word, and keyword candidates are extracted from this range. In a second embodiment, however, information to be collected is restricted to screen information concerning the screen of the information retrieval terminal 10, and text information is obtained from this screen information. Then, even if there is no word in the text information which matches a retrieval word, a word extraction range can be determined based on attribute information concerning the screen, and keyword candidates are extracted from the word extraction range.

Figure 6A:
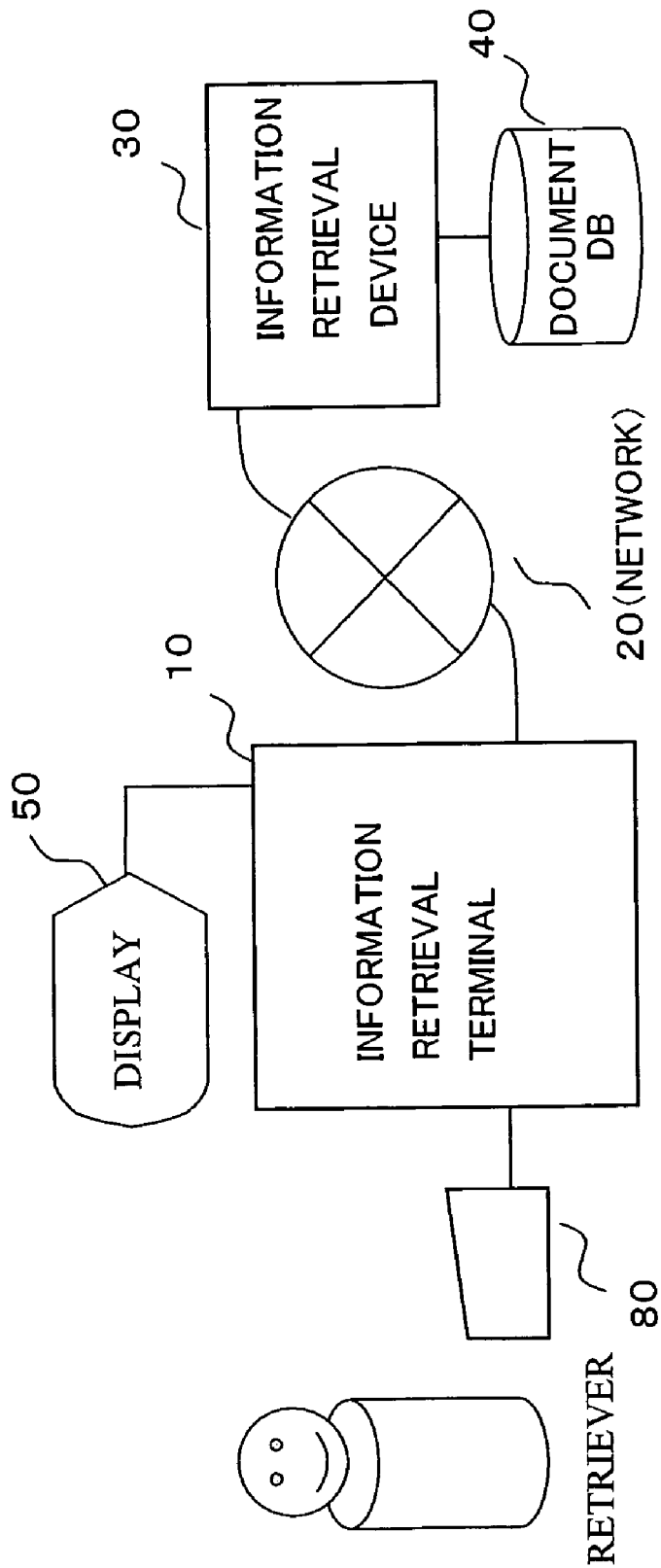
FIGS. 6A and 6B are block diagrams illustrating an information retrieval terminal according to a second embodiment of the present invention.

FIG. 6A illustrates the overall configuration of the second embodiment including the information retrieval terminal 10. As in the first embodiment, the information retrieval terminal 10 is connected to the information retrieval device 30 via the network 20. The display 50 and the keyboard 80 are connected to the information retrieval terminal 10. The roles of the display 50 and the keyboard 80 are similar to those of the first embodiment.

Figure 6B:
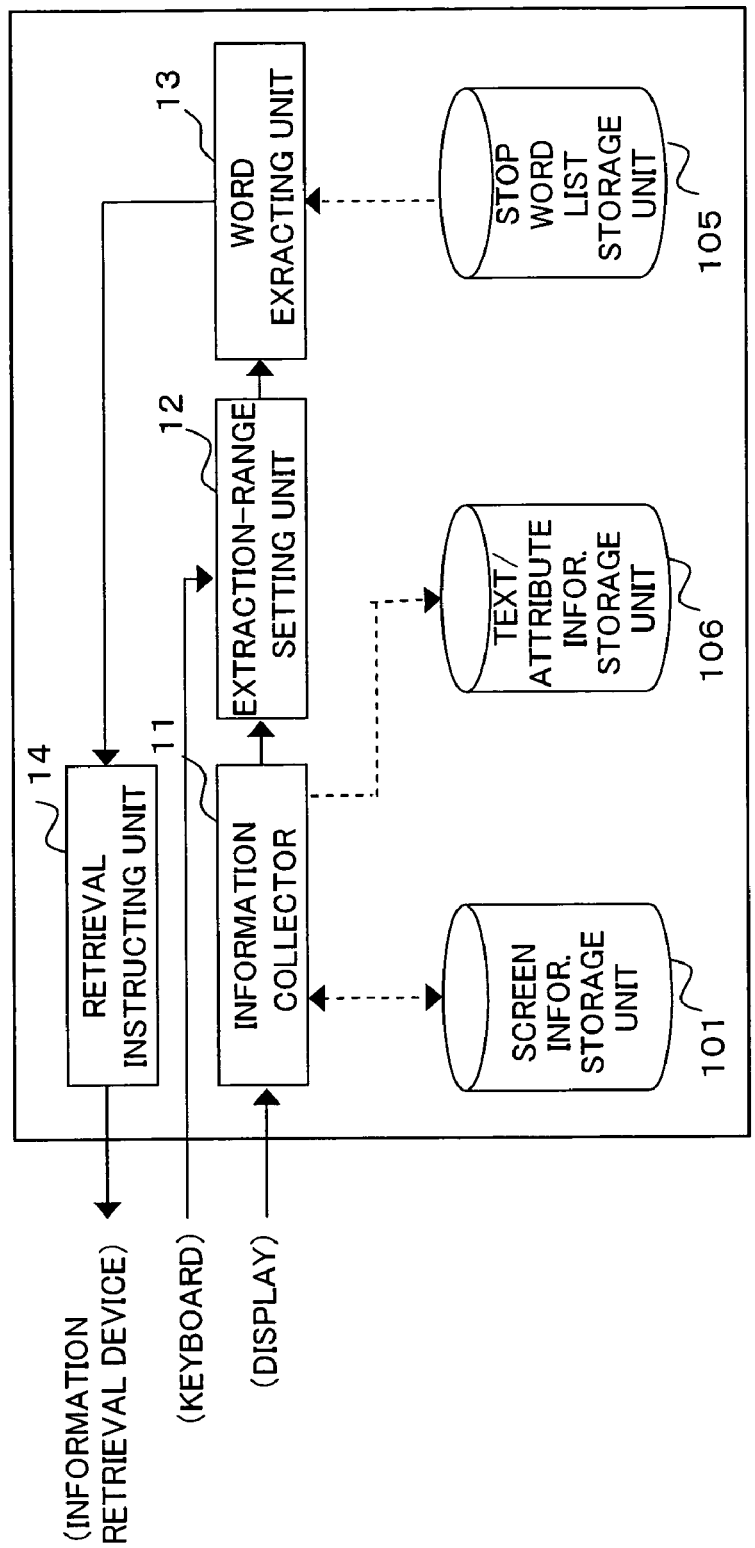

The internal configuration of the information retrieval terminal 10 is shown in FIG. 6B. The information retrieval terminal 10 includes processors, such as the text information collector 11, the extraction-range setting unit 12, the word extracting unit 13, and the retrieval instructing unit 14. The information retrieval terminal 10 also includes storage units, such as the screen information storage unit 101, a text/attribute information storage unit 106, and the stop word list storage unit 105. The function of displaying retrieval results returned from the information retrieval device 30 is not shown.

The text information collector 11 collects screen information from the display 50, and stores it in the screen information storage unit 101. The text information collector 11 then obtains text information and attribute information concerning the screen (for example, the order of overlapping windows and the ranges of windows displayed) from the collected screen information, and stores the obtained text information and attribute information in the text/attribute information storage unit 106.

If a word matching a retrieval word input by the retriever is found in the text information, the extraction-range setting unit 12 sets a word extraction range based on the found word in a manner similar to the first embodiment. If a word matching the retrieval word is not found, the extraction-range setting unit 12 sets a word extraction range based on the attribute information.

The word extracting unit 13 and the retrieval instructing unit 14 are similar to those of the first embodiment. More specifically, the word extracting unit 13 extracts keyword candidate words from a word extraction range and rejects the words registered in the stop word list storage unit 105, thereby determining candidate words. The retrieval instructing unit 14 instructs the information retrieval device 30 to retrieve by using the keyword candidate words and the retrieval word as keywords.

The screen information storage unit 101 and the stop word list storage unit 105 are similar to those of the first embodiment.

Figure 7:
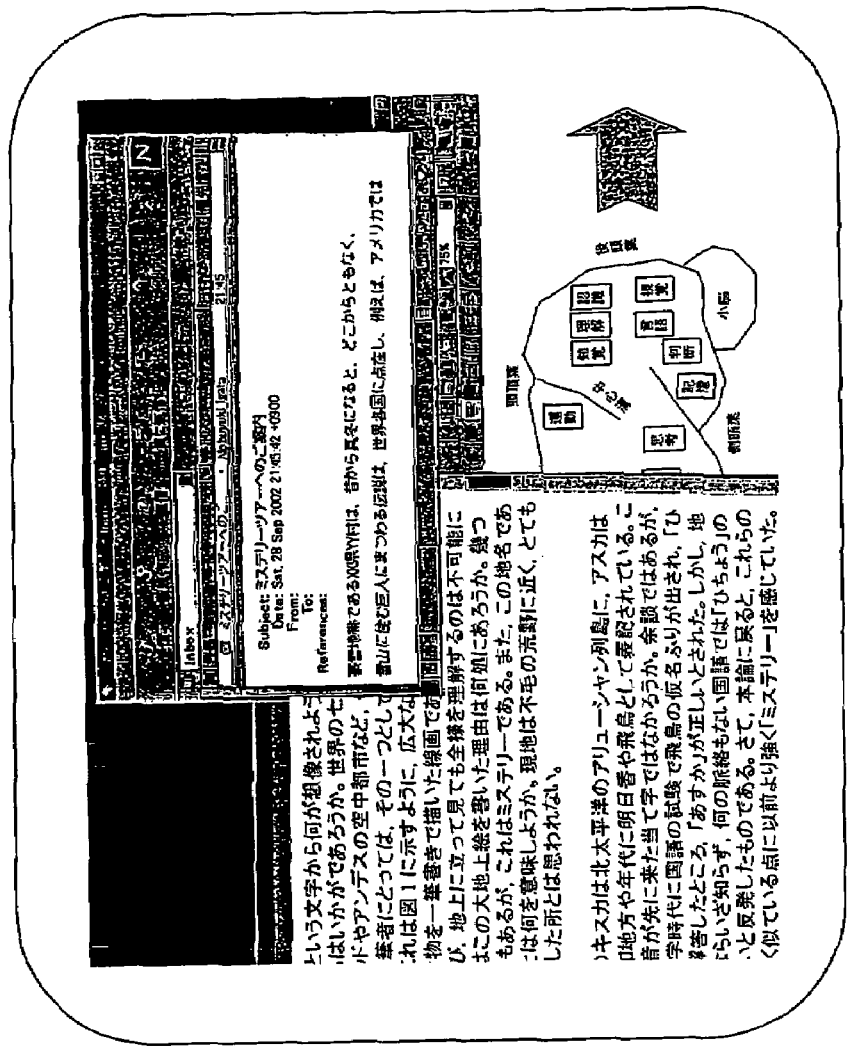
FIG. 7 illustrates an example of the screen in the second embodiment.

The text/attribute information storage unit 106 obtains text information and attribute information from the screen information, and stores them therein. If, for example, three windows, such as those shown in FIG. 7, are displayed on the information retrieval terminal 10, the text information and attribute information are stored, as shown in FIG. 8. File 1 is a file obtained from the information concerning the window displayed at the left of FIG. 7. In the attribute information of file 1, the file type is Tex, the order of the overlapping window is the second from the top, and the display range is from line 34 to line 59. The text information of file 1 includes information concerning the entire file containing the portion hidden behind the window. The same applies to file 2 and file 3.

Figure 9:
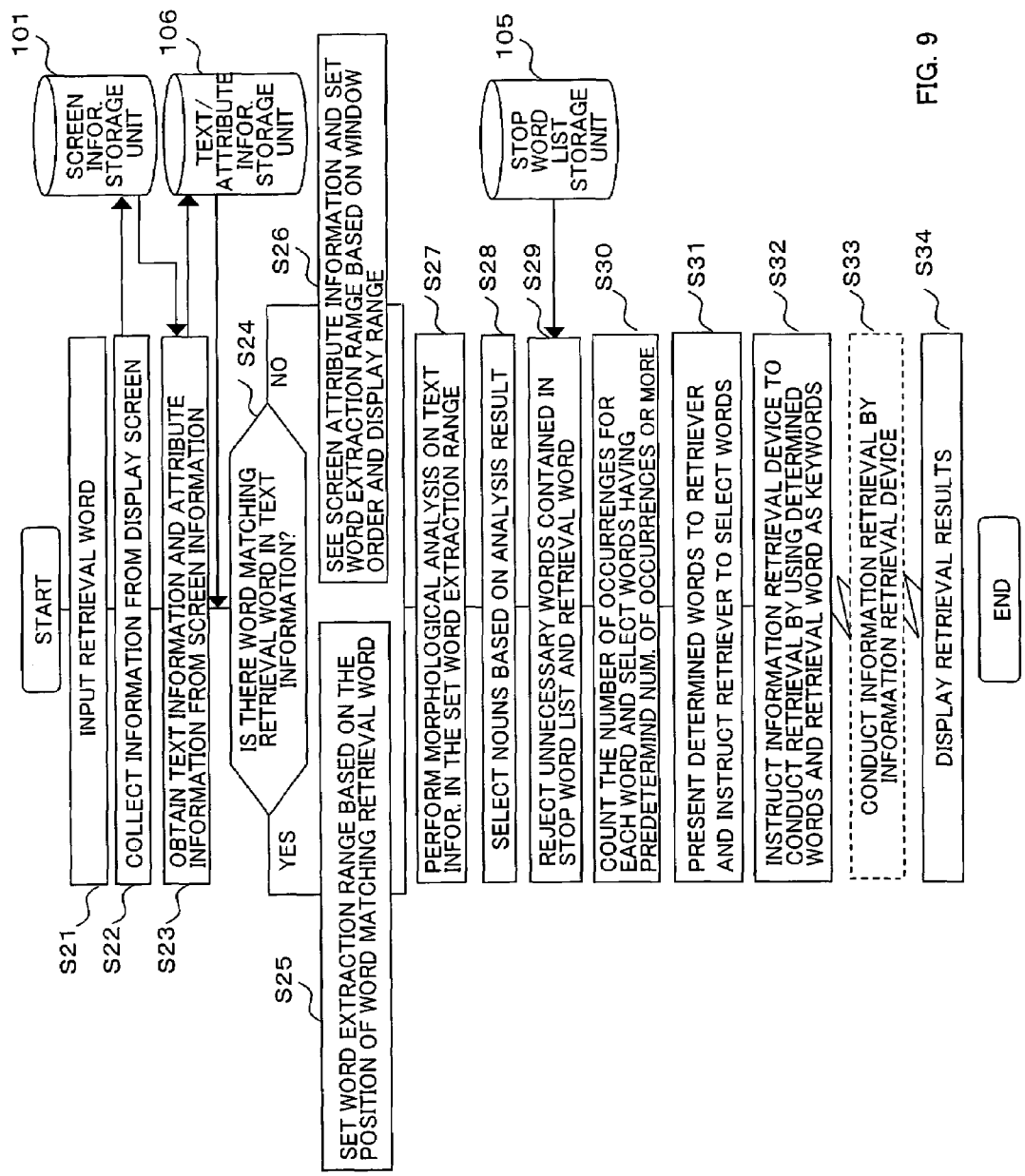
FIG. 9 is a flowchart illustrating the second embodiment of the present invention.

The second embodiment is described below with reference to the flowchart of FIG. 9. In step S21, a retrieval word is input by the retriever. Then, in step S22, information concerning the screen displayed on the display 50 of the information retrieval terminal 10 is collected, and is stored in the screen information storage unit 101. In step S23, text information and attribute information for each window are obtained from the stored screen information, and are stored in the text/attribute information storage unit 106. Steps S21 through S23 are executed by the text information collector 11 shown in FIG. 6B.

It is then determined in step S24 by checking text information of each file in the text/attribute information storage unit 106 whether there is a word matching the retrieval word input by the retriever in the text information. If the outcome of step S24 is YES, the process proceeds to step S25. In step S25, as in the first embodiment, based on the position of the word found in step S24, a predetermined number of words are set to be a word extraction range. If it is found in step S24 that there is no word matching the retrieval word, the process proceeds to step S26 in which the word extraction range is determined by referring to the attribute information. More specifically, in step S26, for a file whose window order is 1 (i.e., the topmost window), the text information concerning the overall file is set to be the word extraction range. For files whose window order is 2 or lower, the information indicated by the display range of the attribute information is set to be the word extraction range. Steps S24 through S26 are executed by the extraction-range setting unit 12 shown in FIG. 6B.

Figure 5:
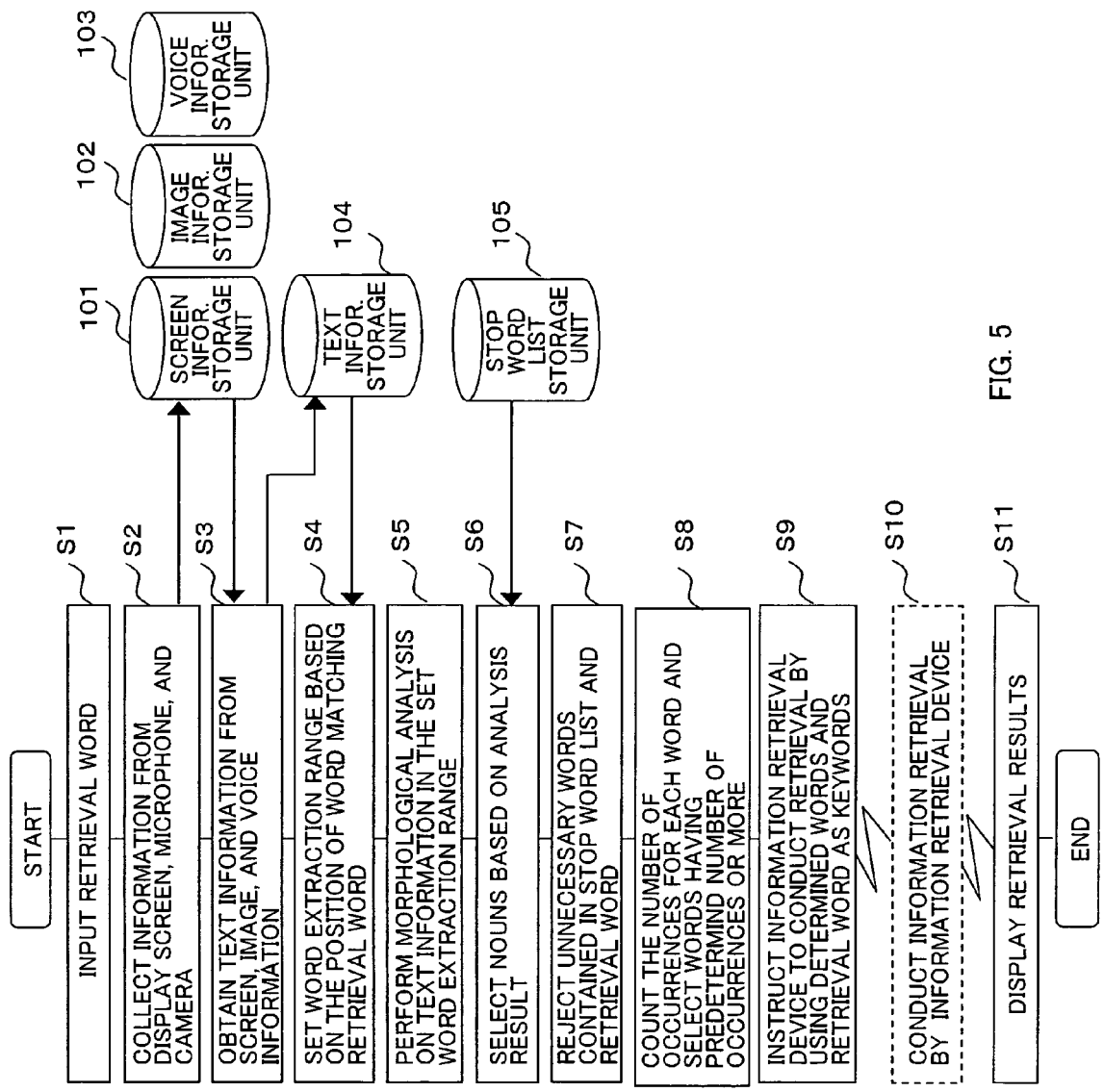
FIG. 5 is a flowchart illustrating the first embodiment of the present invention.

Steps S27 through S30 are similar to steps S5 through S8, respectively, of the flowchart in FIG. 5, and steps S32 through S34 are similar to steps S9 through S11, respectively, of the flowchart of FIG. 5. In the second embodiment, however, in step S31, the keyword candidate words are presented to the retriever and the retriever is instructed to choose desired words. Steps S27 through S34 are executed by the word extracting unit 13 and the retrieval instructing unit 14 shown in FIG. 6B.

In step S30, the number of occurrences of each word is counted, and words having a predetermined number of occurrences or more are set to be keyword candidates. However, the number of occurrences may be weighted based on the attribute information, such as the window order and display range. With this arrangement, importance can be given to, for example, the window order.

What is claimed is:

1. An information retrieval terminal, comprising:
    retrieval word receiver means for receiving a retrieval word that is inputted by users:
    text information collection means for acquiring text information on a display screen of a display device attached to the information retrieval terminal, and screen attribute information including an order of overlapping windows and a displayed range of each of a plurality of files that are opened on the display screen of the display device, and for storing the text information and the screen attribute information in a text information storage unit;

extraction range setting means for determining a position of a word which matches the received retrieval word from the text information stored in the text information storage unit, setting a word extraction range in the text information by using the position of the word in the text information stored in the text information storage unit and a predefined number of words around the determined position of the word, or when there is no word matching the retrieval word in the text information, setting a word extraction range based on the screen attribute information;

word extraction means for performing a morphological analysis of the text information within the word extraction range, and for extracting a word that is different from the retrieval word as a keyword candidate; and retrieval instruction means for instructing the information retrieval device using the keyword candidate and the retrieval word.

2. A computer-readable medium encoded with an information retrieval program for giving retrieval information and retrieval instructions to a computer, the information retrieval program causing the computer to perform a process comprising:

Receiving a retrieval word that is inputted by users:

Acquiring text information on a display screen of a display device attached to the information retrieval terminal, and screen attribute information including an order of overlapping windows and a displayed range of each of a plurality of files that are opened on the display screen of the display device, and for storing the text information and the screen attribute information in a text information storage unit;

determining a position of a word which matches the received retrieval word from the text information stored in the text information storage unit, setting a word extraction range in the text information by using the position of the word in the text information stored in the text information storage unit and a predefined number of words around the determined position of the word, or when there is no word matching the retrieval word in the text information, setting a word extraction range based on the screen attribute information;

performing a morphological analysis of the text information within the word extraction range, and for extracting a word that is different from the retrieval word as a keyword candidate; and instructing the information retrieval device using the keyword candidate and the retrieval word.

3. A method for retrieving information using a computer, comprising:

Receiving a retrieval word that is inputted by users:

Acquiring text information on a display screen of a display device attached to the information retrieval terminal, and screen attribute information including an order of overlapping windows and a displayed range of each of a plurality of files that are opened on the display screen of the display device, and for storing the text information and the screen attribute information in a text information storage unit;

determining a position of a word which matches the received retrieval word from the text information stored in the text information storage unit, setting a word extraction range in the text information by using the position of the word in the text information stored in the text information storage unit and a predefined number of words around the determined position of the word, or when there is no word matching the retrieval word in the text information, setting a word extraction range based on the screen attribute information;

performing a morphological analysis of the text information within the word extraction range, and for extracting a word that is different from the retrieval word as a keyword candidate; and instructing the information retrieval device using the keyword candidate and the retrieval word.

4. An information retrieval terminal according to claim 1, wherein the word extraction means counts a frequency of occurrence of the word extracted, and makes the keyword candidate at least one of the words occurring more than a predefined frequency of occurrence.

5. The information retrieval terminal as defined in claim 1, wherein said extraction range setting means sets the word extraction range at a range of the text information that is displayed on the display screen, or the entire text information displayed on the display screen, if the text information is at a top overlap order, when there is no word matching the retrieval word in the text information.

6. The computer-readable medium as defined in claim 2, wherein the word extraction range is set at a range of the text information that is displayed on the display screen, or the entire text information displayed on the display screen, if the text information is at a top overlap order, when there is no word matching the retrieval word in the text information.

7. The method as defined in claim 3, wherein the word extraction range is set at a range of the text information that is displayed on the display screen, or the entire text information displayed on the display screen, if the text information is at a top overlap order, when there is no word matching the retrieval word in the text information.

* * * * *